(12) United States Patent
Bernitsas et al.

(10) Patent No.: US 10,031,248 B2
(45) Date of Patent: Jul. 24, 2018

(54) REAL-TIME INFILL IN MARINE SEISMIC SURVEYS USING AN INDEPENDENT SEISMIC SOURCE

(71) Applicant: ION GEOPHYSICAL CORPORATION, Houston, TX (US)

(72) Inventors: Nikolaos Bernitsas, Sugar Land, TX (US); David James Brookes, Houston, TX (US); David Ridyard, Sugar Land, TX (US); Douglas F. Allinson, Sugar Land, TX (US)

(73) Assignee: ION Geophysical Corporation, Houston, TX (US)

(*) Notice: Subject to any disclaimer, the term of this patent is extended or adjusted under 35 U.S.C. 154(b) by 85 days.

(21) Appl. No.: 14/977,791

(22) Filed: Dec. 22, 2015

(65) Prior Publication Data

US 2016/0178776 A1 Jun. 23, 2016

Related U.S. Application Data

(60) Provisional application No. 62/096,382, filed on Dec. 23, 2014.

(51) Int. Cl.
*G01V 1/38* (2006.01)

(52) U.S. Cl.
CPC .................. *G01V 1/3808* (2013.01)

(58) Field of Classification Search
CPC .................................... G01V 1/3808
USPC ...................................... 367/15, 20
See application file for complete search history.

(56) References Cited

U.S. PATENT DOCUMENTS

| | | |
|---|---|---|
| 6,925,386 B2 | 8/2005 | Pramik et al. |
| 2005/0128874 A1 | 6/2005 | Herkenhoff et al. |
| 2005/0190650 A1* | 9/2005 | Ferber .............. G01V 1/364 367/43 |
| 2008/0144438 A1* | 6/2008 | Ferber .............. G01V 1/20 367/56 |

(Continued)

FOREIGN PATENT DOCUMENTS

| | | |
|---|---|---|
| WO | 0225315 A2 | 3/2002 |
| WO | 2012162433 A2 | 11/2012 |

OTHER PUBLICATIONS

Hampson, Gary, et al., "Acquisition Using Simultaneous Sources," The Leading Edge, Special Section: Seismic Acquisition, Jul. 2008, pp. 918-923.

(Continued)

*Primary Examiner* — Daniel L Murphy
(74) *Attorney, Agent, or Firm* — Holland & Hart LLP (57) ABSTRACT

Embodiments of real-time infill in marine seismic surveys using an independent seismic source are described. One method of seismic data acquisition includes acquiring primary seismic data at a plurality of streamers towed by an acquisition vessel based at least in part on energy emitted by a first seismic source, and towing an independent seismic source to acquire infill seismic data at the plurality of streamers based at least in part on energy emitted by the independent seismic source while the primary seismic data is still being acquired at the plurality of streamers based at least in part on the energy emitted by the first seismic source, wherein the independent seismic source is towed independently of the acquisition vessel.

25 Claims, 10 Drawing Sheets

(56) References Cited

U.S. PATENT DOCUMENTS

| | | | |
|---|---|---|---|
| 2008/0225642 A1* | 9/2008 | Moore | G01V 1/28 367/73 |
| 2008/0285381 A1* | 11/2008 | Moldoveanu | G01V 1/3808 367/20 |
| 2012/0300583 A1 | 11/2012 | Flynn et al. | |
| 2013/0188448 A1* | 7/2013 | Siliqi | G01V 1/3808 367/15 |

OTHER PUBLICATIONS

Ridsdill-Smith, Tom, et al., "Benefits of Two-Boat 4D Acquisition, an Australian Case Study," The Leading Edge, Special Section: Seismic Acquisition, Jul. 2008, pp. 940-944.
International Search Report for International App. No. PCT/US2015/000490 dated Apr. 15, 2016 from European Patent Office.

\* cited by examiner

REAL-TIME INFILL IN MARINE SEISMIC SURVEYS USING AN INDEPENDENT SEISMIC SOURCE

CROSS REFERENCES

This application claims priority to U.S. Provisional Patent Application No. 62/096,382, titled "REAL-TIME INFILL IN MARINE SEISMIC SURVEYS USING AN INDEPENDENT SEISMIC SOURCE," filed Dec. 23, 2014, which is incorporated by reference in its entirety for all purposes.

BACKGROUND

The present disclosure generally relates to seismic data acquisition and processing, and more particularly to real-time infill in marine seismic surveys using an independent seismic source.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include emitting seismic energy into the Earth with a seismic energy source (e.g., dynamite, air guns, vibrators, etc.), and monitoring the Earth's response to the seismic source with one or more receivers in order to create an image of the subsurface of the Earth.

Certain types of marine seismic surveys involve towing one or more streamer cables with a plurality of receivers behind an acquisition vessel along pre-plotted sail lines. Each receiver includes, for example, a pressure sensor, a particle motion sensor, or both a pressure sensor and a particle motion sensor in proximity to one another. The pressure sensor may be, for example, a hydrophone that records scalar pressure measurements of a seismic wavefield. The particle motion sensor may be, for example, a three-component geophone or accelerometer that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

During the course of such a marine seismic survey, many factors can affect the seismic data that is acquired. For example, ocean currents or other environmental factors can cause the acquisition vessel and/or the streamer cables to deviate from their pre-plotted and intended courses, which may lead to gaps or holes in the coverage of the acquired seismic data. Also, some sources or receivers may malfunction. Also, different events may cause data that is acquired to be low quality or noisy. These factors, as well as other factors, may impact the quality and/or quantity of the seismic data that is acquired for certain subsurface regions.

In conventional marine seismic streamer surveys, the acquisition vessel and streamer cables typically complete many sail lines to acquire seismic data over a relatively large area of the subsurface. Following the completion of a number of adjacent sail lines of that initial, primary seismic data acquisition survey, the acquired seismic data may be analyzed (e.g., the coverage) to determine whether any "infill" seismic data needs to be acquired. Infill seismic data may need to be acquired if, for example, the coverage of a certain area is less than a predetermined threshold (e.g., if certain common midpoint bins are less than a certain percentage full). In order to acquire such infill seismic data, the one or more streamer cables with a plurality of receivers are again towed behind the acquisition vessel over appropriate subsurface regions in an attempt to infill the data. Such infill operations, like the primary acquisition, can be quite costly, especially because the acquisition vessel typically has left the area before the determination is made that infill seismic data is needed. In addition, infilling seismic data can delay data processing and analysis, and, depending on weather and other conditions during the infill operation, the desired seismic data may not even be acquired.

DETAILED DESCRIPTION

Described herein are methods and systems for acquiring real-time infill seismic data in marine seismic surveys using an independent seismic source. As described in more detail below, while the acquisition vessel is acquiring the primary seismic data using any of a number of different acquisition geometries and strategies, an independent seismic source is towed, independent of the acquisition vessel, in a position so as to acquire infill seismic data using the independent seismic source and the same streamers that are acquiring the primary seismic data. In order to determine where and how the independent seismic source should be positioned, the ocean current induced streamer feathering and the primary seismic data being collected may be analyzed in real-time to determine where infill seismic data is needed, and the independent seismic source may be towed and activated while the primary seismic data is still being acquired in order to simultaneously acquire the primary seismic data and the infill seismic data using the same streamers towed by the acquisition vessel. By acquiring the infill seismic data during the primary seismic survey, the acquisition vessel may not need to return and reacquire some or all of the infill sail lines that would otherwise be necessary, thus reducing the overall cost and duration of the survey. Moreover, such a system can further be extended by not only analyzing current or recent primary acquisition data to react to infill needs, but may proactively predict likely coverage of certain areas in order to forecast a projected need for infill seismic data and tow the independent seismic source accordingly.

Figure 1:
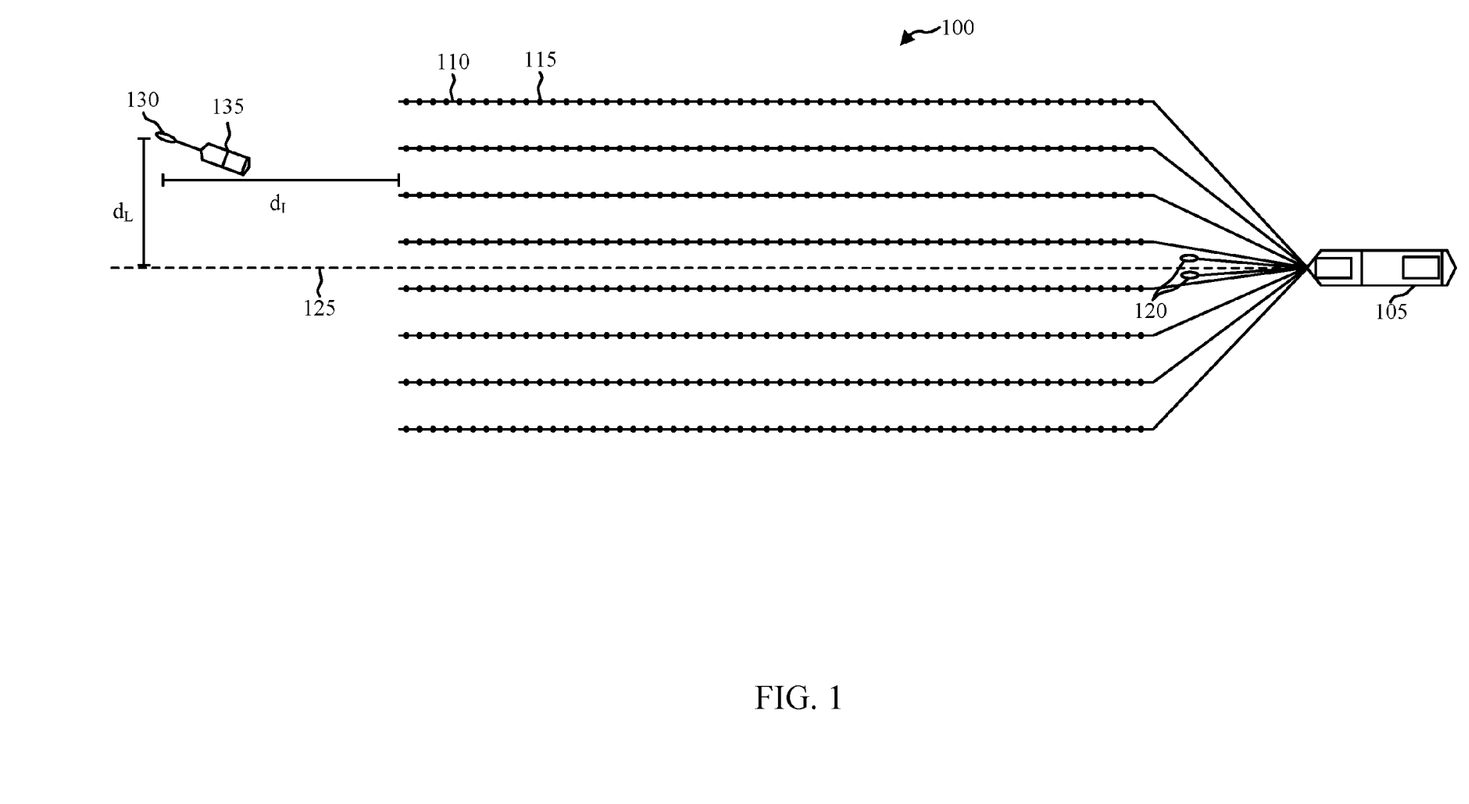
FIG. 1 is a diagram illustrating an example of a marine seismic data acquisition survey system in accordance with aspects of the present disclosure.

Turning now to the figures, FIG. 1 is a diagram illustrating an example of a marine seismic data acquisition survey system 100 in accordance with aspects of the present disclosure. The system 100 includes an acquisition vessel 105 towing a plurality of streamers 110. Although illustrated as being straight and parallel, in some embodiments the plurality of streamers 110 may instead take on irregular shapes, for example including feathering, flaring, and/or curving due, at least in part, to the impact of ocean currents. Each of the streamers 110 includes a plurality of receivers 115, and each of the receivers 115 includes one or more sensors, such as a pressure sensor or a particle motion sensor. In FIG. 1, the acquisition vessel 105 also tows one or more seismic sources 120, such as air guns. As the acquisition vessel 105 traverses pre-plotted sail line 125, the seismic source 120 may emit seismic energy, and the receivers 115 may sense reflections of the emitted seismic energy after the emitted energy reflects off of subsurface regions of interest. In this manner, primary seismic data is acquired at the streamers 110 towed by the acquisition vessel 105 based at least in part on energy emitted by the primary seismic source(s) 120 that are also towed by the acquisition vessel 105. In other embodiments, however, and as described below, primary seismic data may be acquired using primary seismic sources 120 that are towed independently from the acquisition vessel 105, but in the example shown in FIG. 1, the primary seismic data is acquired using a conventional seismic source 120 towed by the acquisition vessel 105.

An independent seismic source 130 is also shown in the system 100. The independent seismic source 130 is towed by an independent source vessel 135 independently of the acquisition vessel 105. The independent seismic source 130 is towed to acquire infill seismic data at the streamers 110 based at least in part on seismic energy emitted by the independent seismic source 130 while the primary seismic data is still being acquired at the streamers 110 based at least in part on the seismic energy emitted by the primary seismic source(s) 120. The infill seismic data may be acquired while the primary seismic data is still being acquired in that the acquisition vessel 105 is still traversing the sail line 125 and acquiring seismic data based on the primary seismic source 120 and the streamers 110 in a conventional manner, but the streamers 110 are also sensing reflected seismic energy from the independent seismic source 130 that is being towed in a manner to create common midpoint or other coverage (such as interpolation of sub-surface sampling using a regularization process) to infill gaps or holes in the primary seismic data. It should also be noted that after the acquisition vessel 105 nears the end of the sail line 125, even if the primary seismic data acquisition using the primary seismic source 120 stops, acquisition of the infill seismic data using the independent seismic source 130 may continue as the streamers 110 (e.g., the posterior ends of the streamers 110) continue to traverse the sail line 125 and even, in some embodiments, as the acquisition vessel 105 turns on its way to start the next sail line.

The additional, contemporaneous acquisition of infill seismic data using the independent seismic source 130 is made possible in some embodiments by the relatively long length of the streamers 110 (which can be several kilometers long). This relatively long length provides an interval between when the forward ends of the streamers 110 pass over a particular subsurface region and when the posterior ends of the streamers 110 pass over that same subsurface region. This interval may be minutes, or in some cases an hour or more. During this interval, the quality and/or quantity of the primary seismic data acquired by the streamers 110 based at least in part on seismic energy emitted by the primary seismic source(s) 120 can be analyzed and/or other parameters (such as the observed feathering of the streamers 110) can be analyzed in real-time. Real-time, as used herein, therefore refers to instantaneous or near instantaneous actions, including within milliseconds, seconds, minutes, or even hours, and includes the interval between when the forward ends of the streamers 110 pass over a particular subsurface region and when the posterior ends of the streamers 110 pass over that same subsurface region. As described in more detail below, such real-time analysis may indicate certain infill seismic data that needs to be acquired, and the independent seismic source 130 can be towed in a manner to enable the acquisition of that infill seismic data. For example, an inline distance or displacement $d_I$ of the independent seismic source 130 from the posterior end of one or more of the streamers 110 and/or a lateral distance or displacement $d_L$ from the sail line 125 of the acquisition vessel 105 can be optimally determined and used, as shown in FIG. 1.

In some embodiments, the independent seismic source 130 may emit seismic energy substantially contemporaneously to the primary seismic source(s) 120 emitting seismic energy. For example, the independent seismic source 130 may emit seismic energy at the same exact time as the primary seismic source(s) 120 emit seismic energy, or may do so within milliseconds, seconds, or tens of seconds of one another. In this manner, the streamers 110 may be acquiring primary seismic data (e.g., from reflections associated with seismic energy emitted by the primary source or sources 120) and also infill seismic data (e.g., from reflections associated with seismic energy emitted by the independent seismic source 130).

Figure 2A:
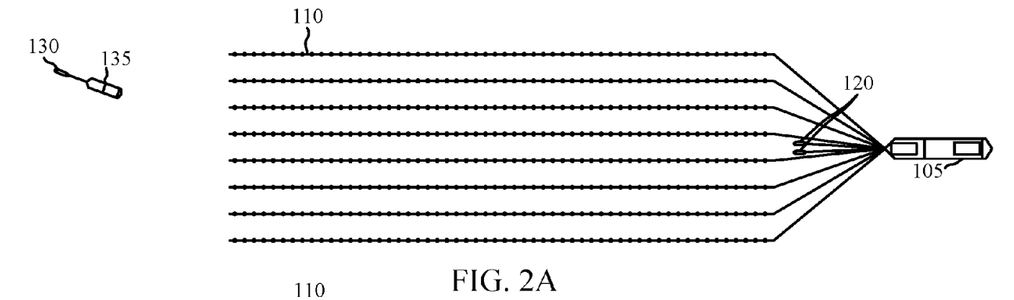
FIGS. 2A-2C are diagrams illustrating examples of primary acquisition sources that may be used in the seismic survey system in FIG. 1 in accordance with aspects of the present disclosure.
Figure 2B:
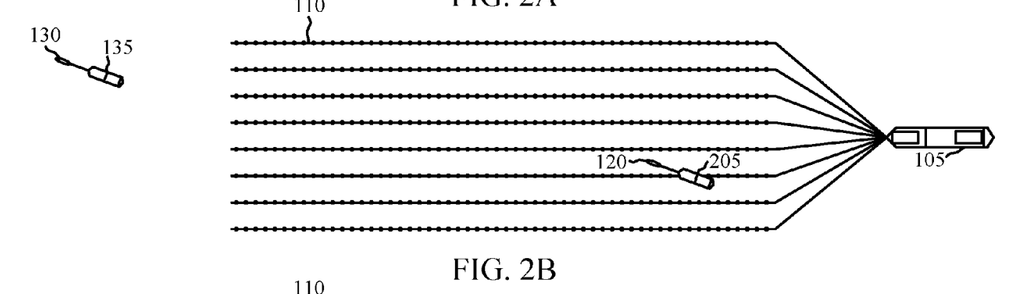
Figure 2C:
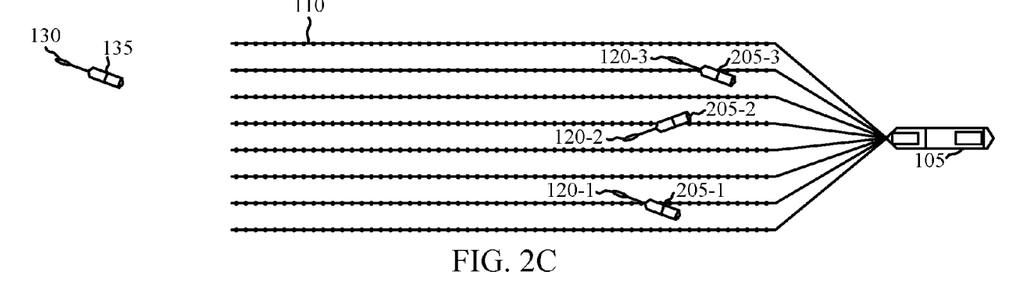

Turning now to FIGS. 2A-2C, several examples are shown of primary acquisition sources 120 that may be used in the seismic survey system 100 from FIG. 1 in accordance with aspects of the present disclosure. Taking first FIG. 2A, an acquisition geometry in which the acquisition vessel 105 tows one or more primary seismic sources 120 is shown. In this example, the same acquisition vessel 105 tows both the primary seismic source(s) 120 and the streamers 110, while an independent source vessel 135 tows the independent seismic source 130 that is used to acquire the infill seismic data.

In FIG. 2B, no primary seismic source is towed by the acquisition vessel 105, but instead an independent source vessel 205 tows the primary seismic source 120 to acquire primary seismic data, and another independent source vessel 135 tows the independent seismic source 130 that is used to acquire infill seismic data. As described for example in co-pending application 61/994,015 filed on May 15, 2014, the entirety of which is hereby incorporated by reference for all purposes, the independent source vessel 205 may tow the primary seismic source 120 above one or more of the streamers 110, which may be towed deeper than in a conventional survey to allow the primary seismic source 120 to undulate within a primary seismic source navigation region above the streamers 110.

In FIG. 2C, like in FIG. 2B, no primary seismic source is towed by the acquisition vessel 105, but instead a plurality of independent source vessels 205-1, 205-2, 205-3 tow respective primary seismic sources 120-1, 120-2, 120-3, while another independent source vessel 135 tows the independent seismic source 130. The plurality of independent source vessels 205-1, 205-2, 205-3 may tow their respective primary seismic sources 120-1, 120-2, 120-3 in an undulating manner between a left side and a right side of a source navigation region over the streamers 110 in some embodiments. In this manner, the independent source vessels 205-1, 205-2, 205-3 tow their respective primary seismic sources 120-1, 120-2, 120-3 above the one or more towed streamers 110. At different points during the survey, the primary sources 120-1, 120-2, 120-3 may be positioned directly over various receivers of the streamers 110, thus allowing for zero-offset and near-offset measurements to be made corresponding to the primary sources 120-1, 120-2, 120-3. It will be appreciated that the streamers 110 are generally towed at a depth that operationally allows for the primary source vessels 205-1, 205-2, 205-3 and the primary seismic sources 120-1, 120-2, 120-3 to be towed above the streamers 110 without tangling or causing other interference or excessive noise.

While FIGS. 2A-2C have described certain primary seismic data acquisition geometries in conjunction with the present disclosure, it will be appreciated that many other acquisition geometries and methods may similarly be used with the teachings of present disclosure. For example, other acquisition geometries and methods that may be used in conjunction with the present disclosure include wide azimuth, narrow azimuth, circular acquisition, time-lapse or 4D acquisition, slanted streamer and over/under acquisition geometries, and so forth. Also, while FIGS. 2A-2C have described one or two primary seismic source(s) 120, it will be appreciated that a single seismic source may be used, multiple seismic sources may be used, one or more seismic source arrays may be used, and so forth. Further, the primary seismic sources may be any type of seismic source, including air guns, marine vibrators, explosives, and so forth.

Figure 3A:
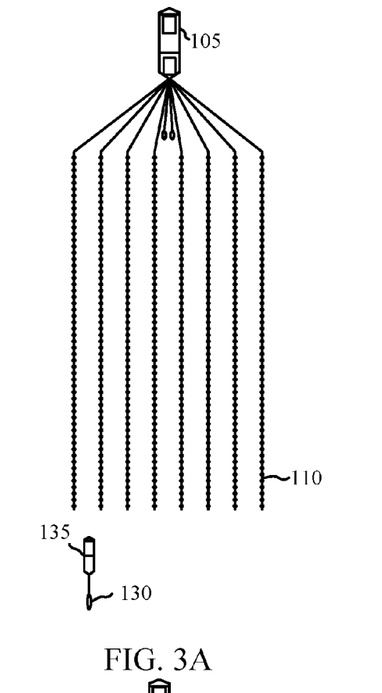
FIGS. 3A-3D are diagrams illustrating examples of independent seismic sources that may be used in the seismic survey system in FIG. 1 in accordance with aspects of the present disclosure.

FIGS. 3A-3D are diagrams illustrating examples of how an independent seismic source 130 may be used in the seismic survey system 100 from FIG. 1 to acquire infill seismic data in accordance with aspects of the present disclosure. Similar to the acquisition geometry shown in FIG. 1, FIG. 3A shows a single independent source vessel 135 towing an independent seismic source 130 following posterior ends of the streamers 110. The arrangement in FIG. 3A may be used in some examples to generate ultra-long offset infill seismic data using the independent seismic source 130.

Figure 3B:
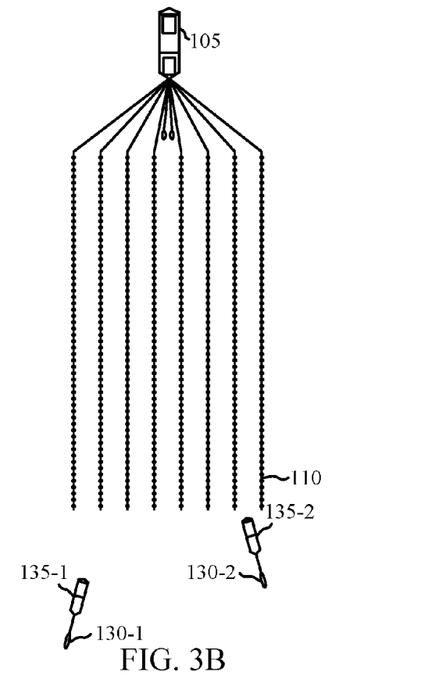
Figure 3C:
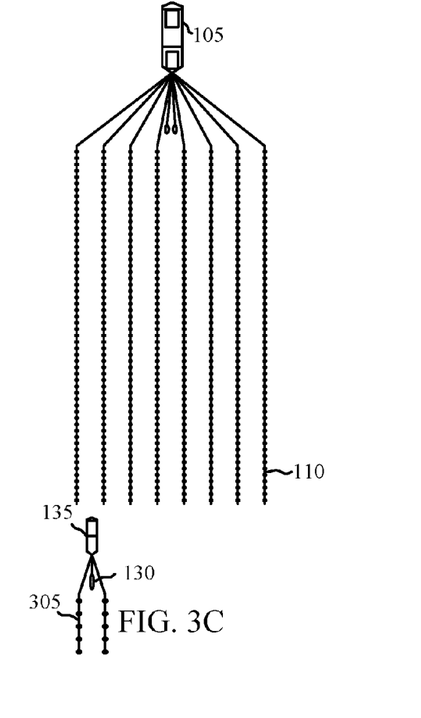

In FIG. 3B, multiple independent source vessels 135-1, 135-2 are shown towing multiple independent seismic sources 130-1, 130-2 to acquire infill seismic data in real-time, as described above. It will be appreciated that, more generally, one, two, three, or even more independent seismic sources 130 may be used to acquire infill seismic data as described herein. In FIG. 3C, the independent source vessel 135 is shown towing not only the independent seismic source 130, but also one or more streamers 305, which may be shorter in length and fewer in number than the streamers 110 towed by the acquisition vessel 105, but may nonetheless sense and record seismic reflection data based on seismic energy emitted by the independent seismic source 130, and, in some embodiments, based on seismic energy emitted by a primary seismic source.

Figure 3D:
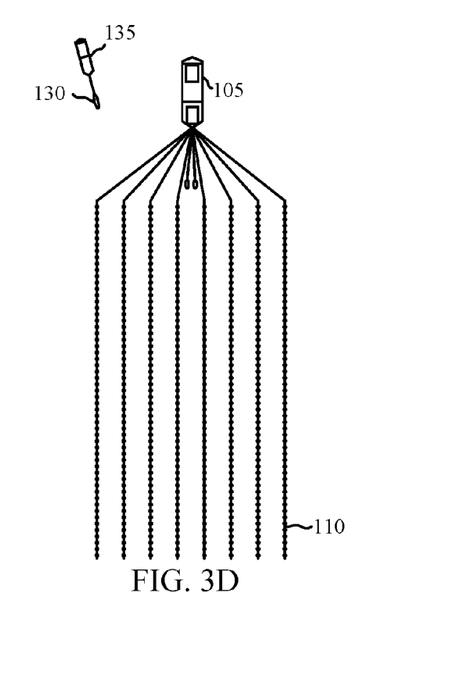

In FIG. 3D, instead of the independent source vessel 135 towing the independent seismic source 130 following posterior ends of the streamers 110 towed behind the acquisition vessel 105, the independent source vessel 135 may tow the independent seismic source 130 ahead of the acquisition vessel 105. As will be appreciated by those skilled in the art, similar common midpoint infill seismic data may be obtained either with the independent seismic source 130 being positioned behind the streamers 110 or ahead of the acquisition vessel 105. In some embodiments, the independent source vessel may be level with or over the streamers on the primary vessel.

While FIGS. 3A-3D have described certain types and configurations of independent seismic sources, it will be appreciated that many other types and configurations of independent seismic sources may similarly be used with the teachings of the present disclosure. For example, more than two independent seismic sources and/or one or more independent seismic source arrays may be used, different types of seismic sources may be used (e.g., the primary seismic source may be an airgun while the independent seismic source may be a marine vibrator). Further, the independent seismic sources may be towed in any appropriate manner. The embodiments described in FIGS. 3A-3D may also be combined in some examples. For example, like in FIG. 3B, two or more independent source vessels may tow two or more respective independent seismic sources ahead of the acquisition vessel 105. As another example of a combination, in some embodiments, one independent source vessel may tow a first independent seismic source ahead of the acquisition vessel 105 and a second independent source vessel may tow a second independent seismic source behind the posterior ends of the streamers 110. Many other combinations and permutations are contemplated. As still another example, the independent (infill) seismic source may be towed somewhere between the front and back of the streamers, while wholly or partially overlapping the streamer spread.

Figure 4:
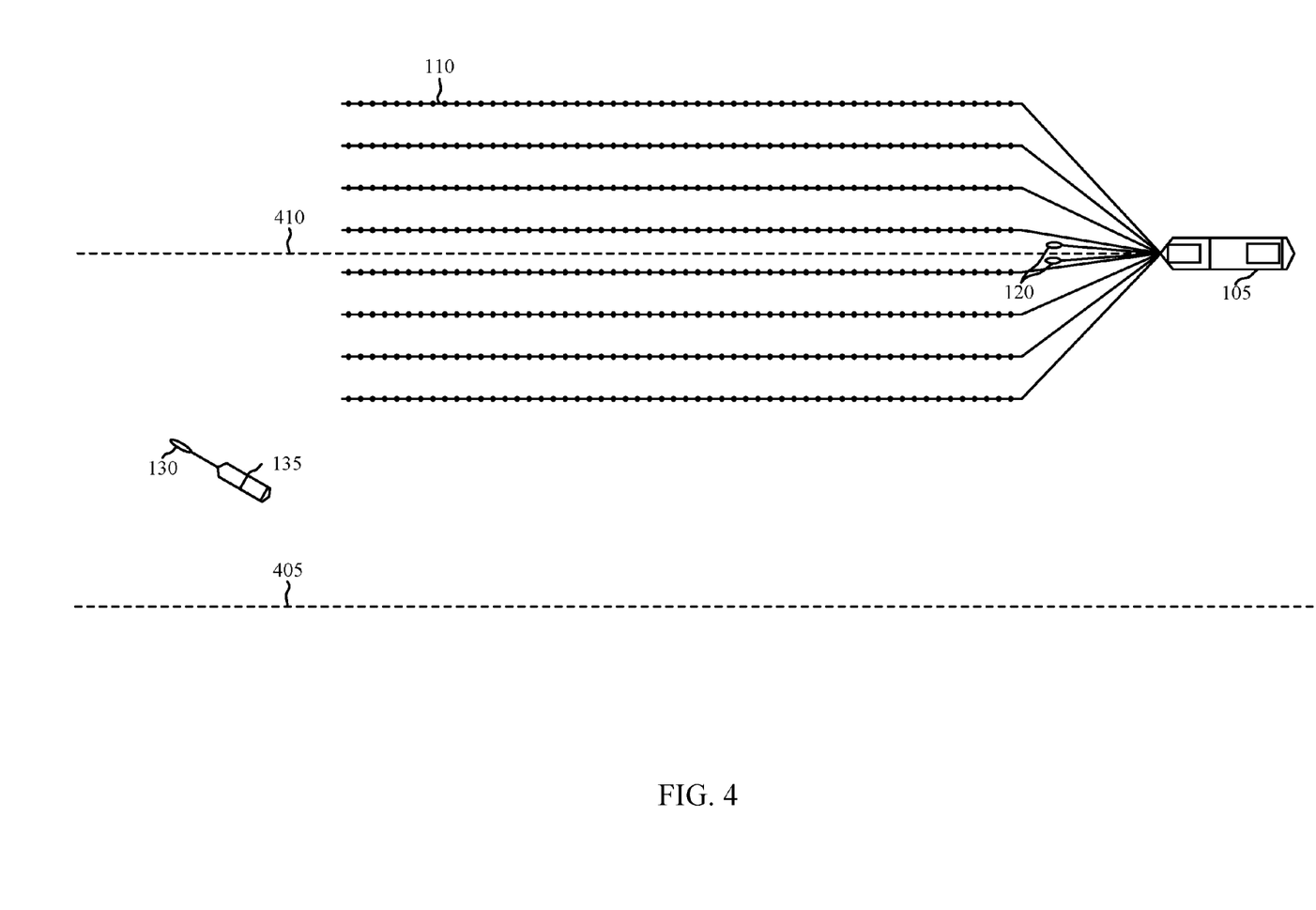
FIG. 4 is a diagram illustrating sail lines that may be traversed by an acquisition vessel in the seismic survey system in FIG. 1 in accordance with aspects of the present disclosure.

FIG. 4 is a diagram illustrating adjacent first and second sail lines 405, 410 that may be traversed by the acquisition vessel 105 of the seismic survey system 100 from FIG. 1 in accordance with aspects of the present disclosure. With reference to FIG. 4, the acquisition vessel 105 may first travel along a first sail line 405 to acquire primary seismic data along the first sail line 405. Optionally, during acquisition of the primary seismic data along the first sail line, infill seismic data may be acquired using the independent seismic source 130, as described earlier. Once the acquisition vessel 105 has completed primary (and in some cases, infill) seismic data acquisition along the first sail line 405, it may subsequently begin to traverse the second sail line 410 that is adjacent to the first sail line 405 to acquire primary seismic data along the second sail line 410. It will be appreciated that the primary acquisition of the first and second sail lines 405, 410 may not be performed back-to-back. Instead, if a typical race-track acquisition pattern is followed during the survey, the acquisition vessel 105 may acquire the first sail line 405, turn to acquire a sail line that is not adjacent to the first sail line 405, turn again, and then acquire the second sail line 410 illustrated in FIG. 4. In this manner, although the first and second sail lines 405, 410 illustrated in FIG. 4 may not be acquired one right after the other, they are nonetheless adjacent to one another. Adjacent, as used herein, may include some overlap, no overlap, or even a gap between the swaths of subsurface regions or water surface areas covered by the streamers 110 during acquisition of the first and second sail lines 405, 410.

While the acquisition vessel 105 travels along the second sail line 410, the independent seismic source 130 may be used to acquire infill seismic data associated with the second sail line 410, or, alternatively, may be used to acquire infill seismic data associated with the first sail line 405. For example, if the primary seismic data acquisition along the second sail line 410 is relatively good, but there was significant feathering or another issue that caused the quality or quantity of the acquired primary seismic data along the first sail line 405 to be less than desired, the independent source vessel 135 may tow the independent seismic source 130 in a manner to generate common midpoints for the needed infill seismic data associated with the first sail line 405. In contrast, if the primary acquisition along the first sail line 405 was relatively good, the independent seismic source 130 may be used to acquire infill seismic data associated with the second sail line 410. As still another example, there may be some portions of the first sail line 405 that require infill seismic data acquisition and some portions of the second sail line 410 that require infill seismic data acquisition. Because the independent seismic source 130 is towed independently of the acquisition vessel 105, in these examples, the independent seismic source may alternate between being used to acquire infill seismic data associated with the first sail line 405 and infill seismic data associated with the second sail line 410.

Referring still to FIG. 4, one or more factors may be considered relating to either the current/very recent or predicted/future acquisition of the primary seismic data for either of the first or second sail lines 405, 410 in order to determine the most effective use of the independent seismic source 130. For example, the decision of where and how to use the independent seismic source 130 may be based at least in part on real-time analysis of coverage of a combination of the primary seismic data and infill seismic data acquired along the first sail line 405, coverage of the primary seismic data acquired/being acquired along the second sail line 410, or coverage of the combination of primary seismic data and infill seismic data acquired along the first sail line 405 together with coverage of the primary seismic data acquired/being acquired along the second sail line 410. As another example, real-time modeling or deterministic algorithmic prediction may be performed based at least in part on observed feathering of the plurality of streamers along the first and/or second sail lines 405, 410 and analysis of coverage of a combination of the primary seismic data and infill seismic data acquired along the first sail line 405, in order to predict likely improved coverage resulting from acquiring infill seismic data associated with the first sail line 405 and/or likely improved coverage resulting from acquiring infill seismic data associated with the second sail line 410. Such real-time modeling or deterministic algorithmic prediction may be used to determine where and how to use the independent seismic source 130 in acquiring infill seismic data.

Figure 5:
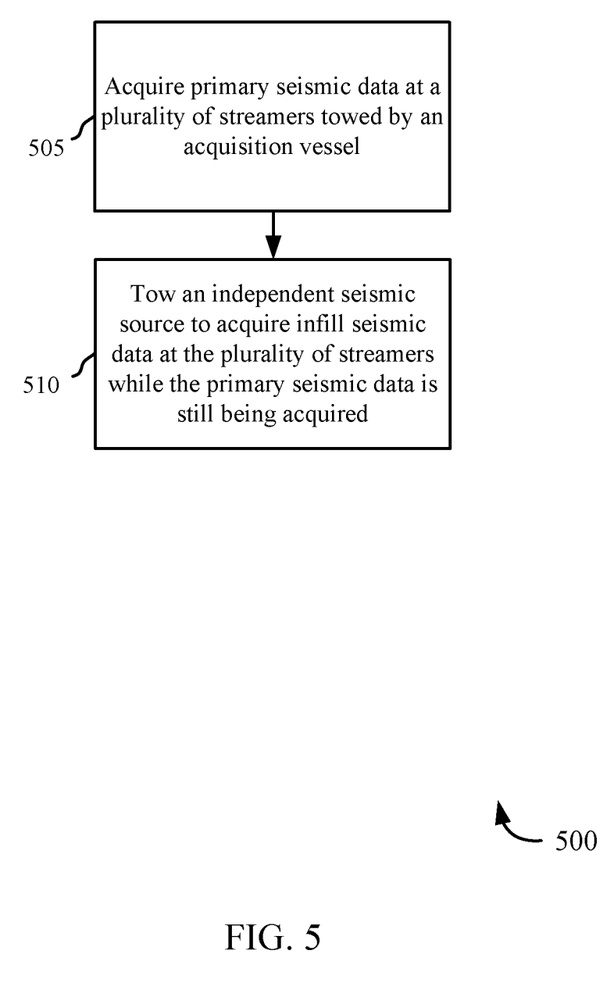
FIG. 5 is a flow chart illustrating an example of conducting a marine seismic survey in accordance with aspects of the present disclosure.

FIG. 5 is a flow chart illustrating an example method 500 of conducting a marine seismic survey in accordance with aspects of the present disclosure. For clarity, the method 500 is described with reference to the seismic data acquisition system 100 shown in FIG. 1 and more fully described with reference to FIGS. 2A-4. At block 505, primary seismic data may be acquired at a plurality of streamers 110 towed by an acquisition vessel 105 based at least in part on energy emitted by a first or primary seismic source 120, which may also be towed by the acquisition vessel 105 or may be towed by an independent source vessel. At block 510, an independent seismic source 130 is towed (e.g., positioned and oriented by an independent source vessel 135) to acquire infill seismic data at the plurality of streamers 110 based at least in part on energy emitted by the independent seismic source 130 while the primary seismic data is still being acquired at the plurality of streamers 110 based at least in part on the energy emitted by the first or primary seismic source 120.

In other words, infill seismic data may be acquired in the method 500 by controlling parameters related to the independent seismic source 130 (e.g., its position and orientation) such that the streamers 110 towed by the acquisition vessel 105 simultaneously record primary seismic data and the infill seismic data. Subsequent to the acquisition, the primary seismic data and infill seismic data may be separated from the traces recorded by the streamers 110 in order to allow for separate treatment during data processing if necessary. In some embodiments, the primary seismic data may be separated from the infill seismic data based on, for example, different source signatures of the primary seismic source 120 and the independent seismic source 130, different anticipated amplitudes and arrival times of reflections from energy emitted by the primary seismic source 120 and the independent seismic source 130, or generally any appropriate manner for separating the infill seismic data from the primary seismic data. In other embodiments, however, the primary seismic data and the infill seismic data may not be separated and instead may be processed together.

Figure 6:
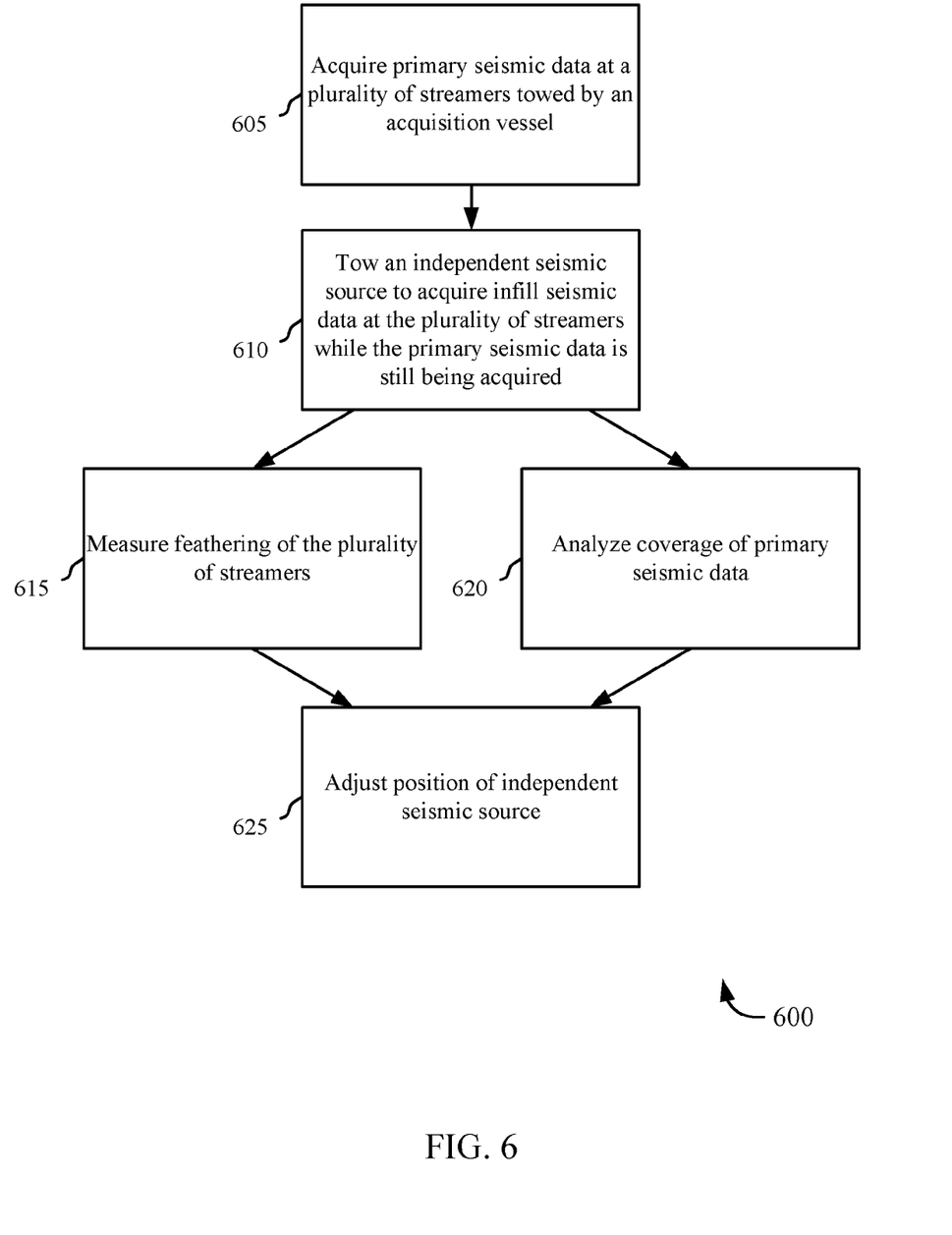
FIG. 6 is a flow chart illustrating an example of conducting a marine seismic survey in accordance with aspects of the present disclosure.

FIG. 6 is a flow chart illustrating an example method 600 of conducting a marine seismic survey in accordance with aspects of the present disclosure. For clarity, the method 600 is described with reference to the seismic data acquisition system 100 shown in FIG. 1 and more fully described with reference to FIGS. 2A-4, and may be an example of one or more aspects of the method 500 described above with reference to FIG. 5. At block 605 of the method 600, primary seismic data may be acquired at a plurality of streamers 110 towed by an acquisition vessel 105—for example, the primary seismic data may be reflected seismic waves corresponding to seismic energy emitted by a primary seismic source 120 as in a conventional seismic survey. At block 610, an independent seismic source 130 may be towed (e.g., by an independent source vessel 135) in such a manner so as to acquire infill seismic data at the plurality of streamers 110 while the primary seismic data is still being acquired by the same plurality of streamers 110.

As the operation in block 610 commences, the operations described in one or both of blocks 615 or 620 may be performed. At block 615, the feathering of the plurality of streamers 110 may be measured and analyzed. At block 620, coverage of the primary seismic data may be analyzed. At block 625, the position and/or orientation of the independent seismic source 130 may be adjusted based at least in part on the measured feathering of the streamers 110 and/or the coverage of the primary seismic data. The position and or the orientation of the independent seismic source may be adjusted by adjusting the speed and direction of the independent source vessel 135 towing the independent seismic source 130. For example, in some embodiments, a lateral displacement $d_L$ of the independent seismic source from a sail line traversed by the acquisition vessel 105 may be adjusted, and/or an inline displacement $d_I$ of the independent seismic source behind the posterior ends of the streamers 110 (or ahead of the acquisition vessel 105) may be adjusted.

Such adjustments may be made in real-time while the primary seismic data is still being acquired. In some embodiments, the independent seismic source 130 may be towed in an undulating manner behind the posterior ends of the streamers 110 or ahead of the acquisition vessel 105, and in these embodiments, the calculated lateral displacement of the independent seismic source 130 may be an average lateral displacement with the independent seismic source 130 undulating about the average lateral displacement.

Figure 7:
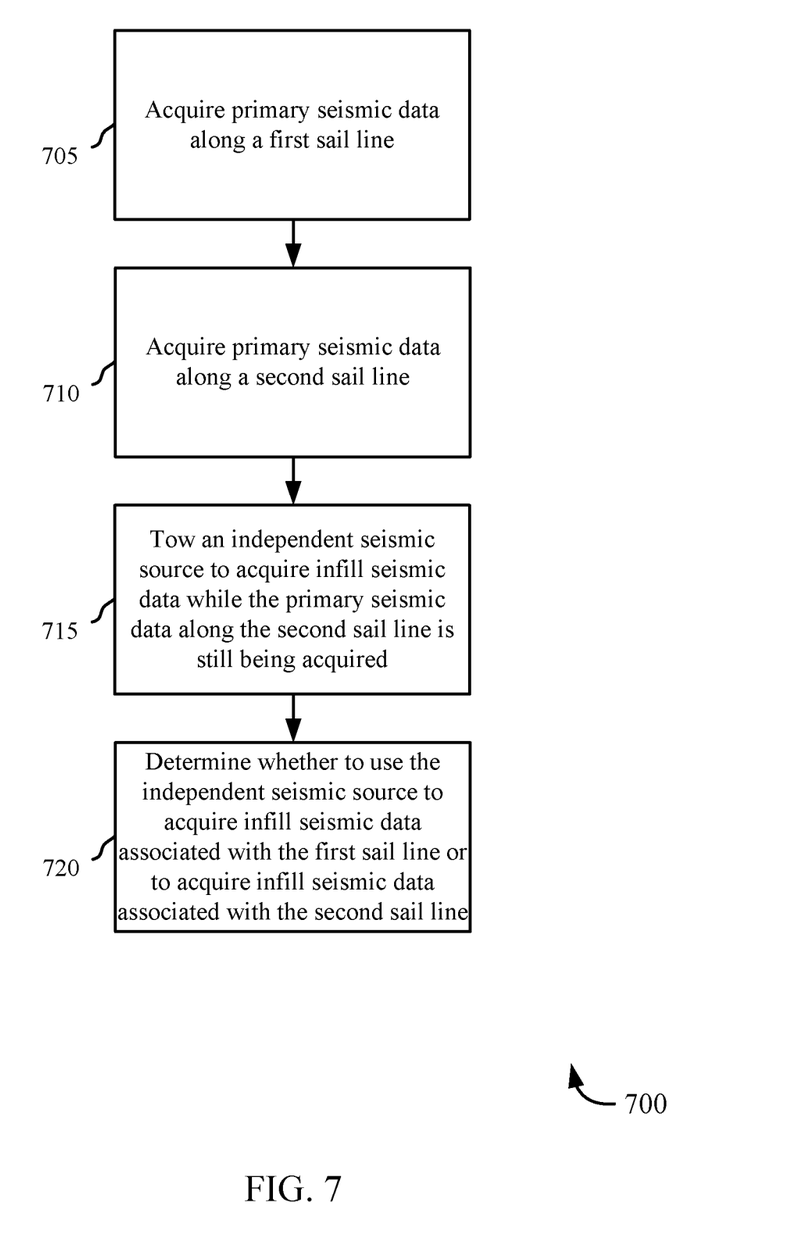
FIG. 7 is a flow chart illustrating an example of conducting a marine seismic survey in accordance with aspects of the present disclosure.

FIG. 7 is a flow chart illustrating an example method 700 of conducting a marine seismic survey in accordance with aspects of the present disclosure. For clarity, the method 700 is described with reference to the seismic data acquisition system 100 shown in FIG. 1 and more fully described with reference to FIGS. 2A-4, and may be an example of one or more aspects of the methods 500, 600 described above with reference to FIGS. 5 and 6. At block 705, primary seismic data is acquired along a first sail line (e.g., sail line 405 in FIG. 4). The primary seismic data may be acquired using the first or primary seismic source 120, and may be recorded by the plurality of streamers 110 towed by the acquisition vessel 105 in FIG. 1. Still referring to block 705, in some embodiments, infill seismic data associated with the first sail line may be acquired while the primary seismic data for the first sail line is still being acquired using an independent seismic source 130, as described above.

At block 710, primary seismic data is acquired along a second sail line (e.g., sail line 410 in FIG. 4) that is adjacent to the first sail line along which primary seismic data was acquired at block 705. As suggested above, the primary seismic data is acquired along the second sail line at block 710 subsequent to the primary seismic data acquisition along the first sail line, but there may be intervening events, such as primary seismic data acquisition along a non-adjacent sail line (e.g., if a race-track type acquisition pattern is followed). The primary seismic data may be acquired using the first or primary seismic source 120, and may be recorded at the plurality of streamers 110 towed by the acquisition vessel 105. Contemporaneously with the operation of block 710 (e.g., while the primary seismic data along the second sail line is still being acquired), and referring now to block 715, an independent seismic source may be towed to acquire infill seismic data. At block 720, contemporaneously with the operations of blocks 710 and 715, it may be determined whether to use the independent seismic source 130 at block 715 to acquire infill seismic data associated with the first sail line (which may be additional or complementary to any infill seismic data that may have been acquired at block 705) or to acquire infill seismic data associated with the second sail line.

The determination made at block 720 may, in some embodiments, be based at least in part on real-time analysis of coverage of a combination of the primary seismic data and infill seismic data acquired along the first sail line at block 705, coverage of the primary seismic data being acquired along the second sail line at block 710, or coverage of the combination of the primary seismic data and infill seismic data acquired along the first sail line at block 705 together with the coverage of the primary seismic data being acquired along the second sail line at block 710. In other embodiments, the determination made at block 720 may be based at least in part on real-time modeling or deterministic algorithmic prediction using observed feathering of the streamers 110 along the second sail line at block 710 and/or analysis of coverage of a combination of the primary seismic data and infill seismic data acquired along the first sail line at block 705 in order to predict likely improved coverage resulting from acquiring infill seismic data associated with the first sail line and likely improved coverage resulting from acquiring infill seismic data associated with the second sail line.

More broadly, and still referring to block 720, the determination of where and how to acquire the infill seismic data may be based on one or more of the following factors: measured (e.g., observed) feathering of the streamers 110 during the first or second sail lines, coverage of primary and/or infill seismic data acquired for the first sail line, coverage of primary seismic data acquired for the second sail line, predictions of likely improved coverage for either the first or second or some other sail line, and so forth. One or more of these factors may be used to determine whether to use the independent seismic source 130 to acquire infill seismic data associated with the first sail line or to acquire infill seismic data associated with the second sail line, and further may be used to determine the best manner in which to acquire such infill seismic data (e.g., the position and orientation of the independent seismic source 130, and how it should be towed as the acquisition vessel 105 advances along the second sail line).

Figure 8:
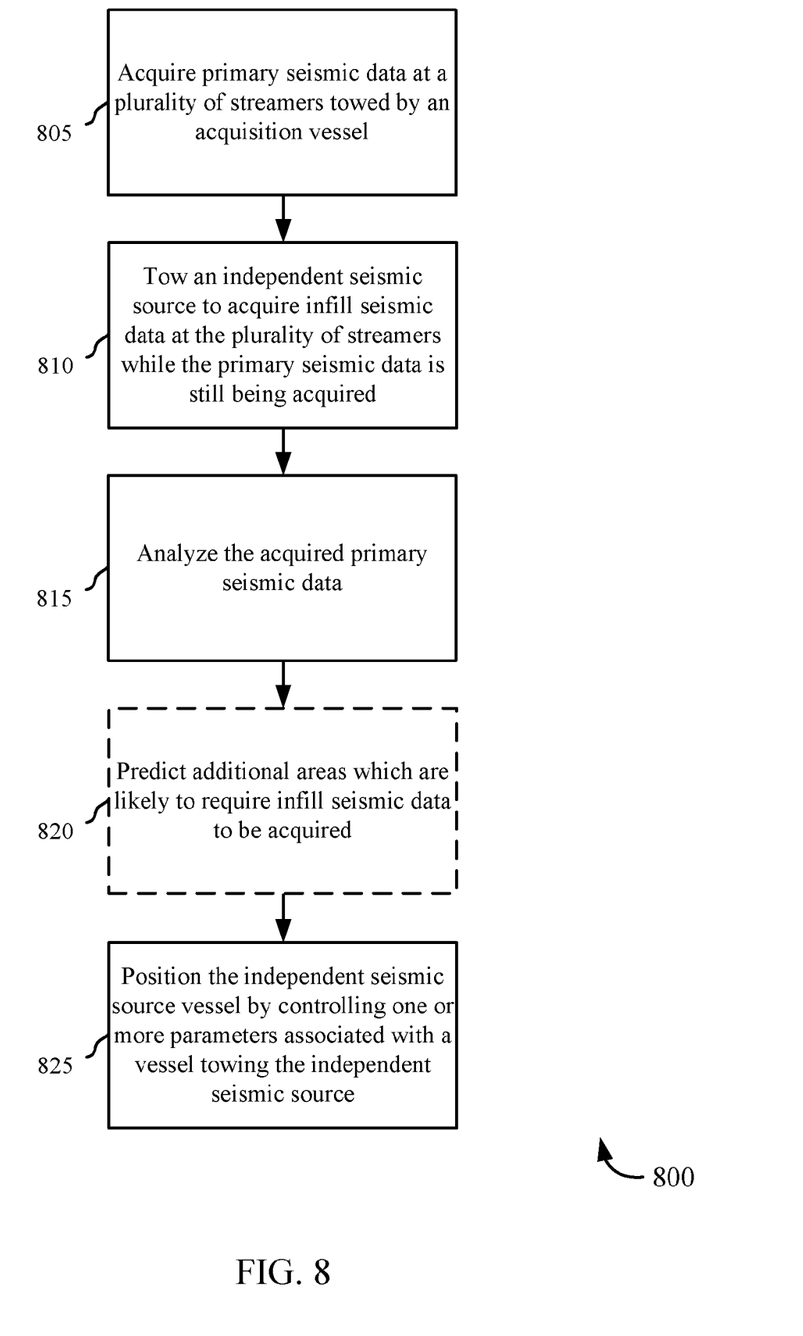
FIG. 8 is a flow chart illustrating an example of conducting a marine seismic survey in accordance with aspects of the present disclosure.

FIG. 8 is a flow chart illustrating an example method 800 of conducting a marine seismic survey in accordance with aspects of the present disclosure. For clarity, the method 800 is described with reference to the seismic data acquisition system 100 shown in FIG. 1 and more fully described with reference to FIGS. 2A-4, and may be an example of one or more aspects of the methods 500, 600, 700 described above with reference to FIGS. 5-7. At block 805 primary seismic data may be acquired at a plurality of streamers 110 towed by an acquisition vessel 105. At block 810, an independent seismic source 130 may be towed (e.g., positioned) in order to acquire infill seismic data at the plurality of streamers 110 while the primary seismic data is still be acquired at block 805. That is, the operation in block 810 may be carried out simultaneously with the operation of block 805 and, in fact, also simultaneously with the operations described in blocks 815, 820, and 825.

At block 815, the acquired primary seismic data may be analyzed in real-time to determine areas in which infill seismic data may need to be acquired. The acquired primary seismic data may be analyzed in real-time in that it is analyzed following sensing of the reflected seismic energy from the first or primary seismic source 120 but prior to posterior ends of the plurality of streamers 110 completing acquisition of the primary seismic data along a sail line that the acquisition vessel is traversing. Optionally, at block 820, additional areas which are likely to require infill seismic data to be acquired may be predicted.

At block 825, the independent source vessel is positioned based at least in part on the areas determined to need infill seismic data at block 815 and/or the areas predicted to be likely to require infill seismic data at block 820. The independent seismic source may be positioned by controlling one or more parameters associated with an independent source vessel 135 towing the independent seismic source 130, for example a speed, a direction, an inline distance or displacement $d_I$ behind posterior ends of the plurality of streamers 110 or ahead of the acquisition vessel 105, an average lateral distance $d_L$ or displacement from the sail line that the acquisition vessel 105 is traversing, and/or an undulation around the average lateral distance $d_L$ from the acquisition vessel 105.

Figure 9:
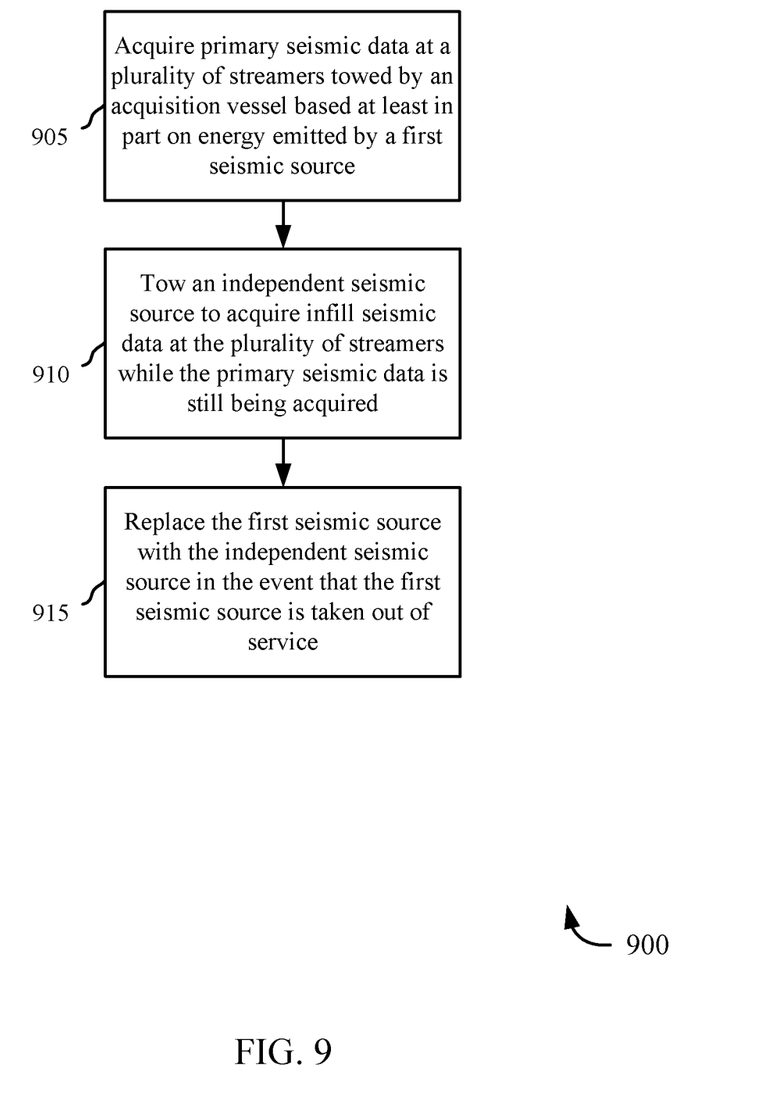
FIG. 9 is a flow chart illustrating an example of conducting a marine seismic survey in accordance with aspects of the present disclosure.

FIG. 9 is a flow chart illustrating an example method 900 of conducting a marine seismic survey in accordance with aspects of the present disclosure. For clarity, the method 900 is described with reference to the seismic data acquisition system 100 shown in FIG. 1 and more fully described with reference to FIGS. 2A-4, and may be an example of one or more aspects of the method 500, 600, 700, 800 described above with reference to FIGS. 5-8. At block 905, primary seismic data may be acquired at a plurality of streamers 110 towed by an acquisition vessel 105 based at least in part on energy emitted by a first seismic source 120. At block 910, an independent seismic source 130 may be towed independently of the acquisition vessel 105 in order to acquire infill seismic data at the plurality of streamers 110 while the primary seismic data is still being acquired. In the event that the first seismic source 120 is taken out of service (e.g., if it malfunctions), at block 915, the first seismic source 120 may be replaced with the independent seismic source 130. For example, if the primary acquisition source 120 is towed independently of the acquisition vessel 105 above the streamers 110, the independent seismic source 130 can simply replace the first or primary seismic source 120 by changing position and can be towed above the streamers 110 as shown in FIG. 2B. Even if the primary seismic source 120 is towed together with the streamers 110 by the acquisition vessel 105, the independent seismic source 130 can replace the failed primary seismic source 120 if it is towed following the posterior ends of the streamers 110, ahead of the primary acquisition vessel 105, to the side of the streamers, and so forth.

In general, and referring to FIGS. 5-9, there may be a hierarchy of uses to which the independent seismic source 130 may be put to use, including, for example, replacing a malfunctioning primary seismic source, acquiring infill seismic data associated with a current sail line, acquiring infill seismic data associated with a previous or future sail line, acquiring ultra-long offset seismic data, acquiring certain types of seismic data while the acquisition vessel 105 is turning, and so forth.

Referring now to the methods 500, 600, 700, 800, 900 illustrated in FIGS. 5-9, the various operations may be carried out by fully automated software, partially automated software, or may be carried out without using software. Also, the operations of methods 500, 600, 700, 800, 900 illustrated in FIGS. 5, 6, 7, 8, and 9 may be rearranged or otherwise modified such that other implementations are possible. Also, in some examples, one or more aspects from one or more of the methods 500, 600, 700, 800, 900 illustrated in FIGS. 5, 6, 7, 8, and 9 may be combined with one or more of the other methods or other aspects of the same respective method, such that many different combinations of the acts and operations described herein are possible and expressly contemplated.

Referring again to the methods 500, 600, 700, 800, 900 described in FIGS. 5-9, it will be appreciated that different entities may perform different aspects of the present disclosure. For example, one entity may be responsible for towing the primary acquisition vessel 105 and streamers 110, while another entity may analyze one or more of the factors described above in real-time, and yet another entity may tow the independent seismic source 130. It will thus be understood that some aspects of conducting a seismic survey as described herein may be performed by one entity with the intent of having one or more other, separate entities perform one or more other aspects of the seismic survey. In other examples, however, a single entity may perform multiple aspects or even all of the aspects of the present disclosure.

Figure 10:
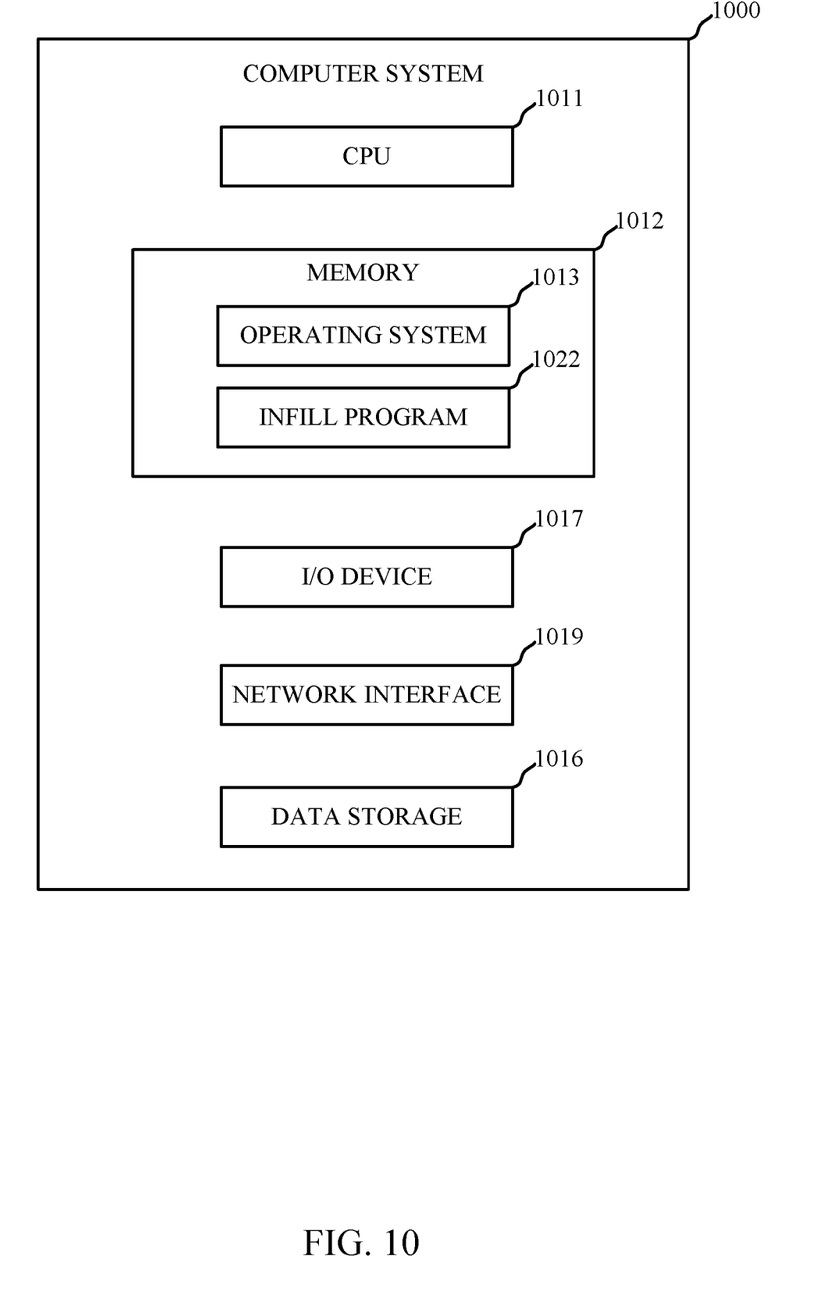
FIG. 10 is a diagram illustrating an example of a computer processing system that may be used in a seismic survey system in accordance with aspects of the present disclosure.

FIG. 10 illustrates an exemplary computer system 1000, which may be used to perform one or more of the operations in the various methods described herein. As illustrated in FIG. 10, the computer system 1000 may include at least one Central Processing Unit (CPU) 1011, a memory 1012, a data storage 1016, an input/output device 1017, and a network interface device 1019. While a single CPU 1011 is shown in FIG. 10, in alternative embodiments, a plurality of CPUs may be implemented within the computer system, or multiple computer systems may be combined as a processing cluster.

The input/output device 1017 may include devices such as a mouse, keyboard, trackball, stylus pen, touchscreen, display (e.g., computer monitor), and the like. The network interface device 1019 may be any entry/exit device configured to allow network communications between the computer system 1000 and another device, e.g., another computer system, a server, and the like. In one embodiment, the network interface device 1019 may be a network adapter or other network interface card (NIC).

Data storage 1016 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 1012 and data storage 1016 could be part of one virtual address space spanning multiple primary and secondary storage devices.

The memory 1012 may be a random access memory that is sufficiently large to hold the necessary programming and data structures of the present disclosure. While memory 1012 is shown as a single entity, it should be understood that memory 1012 may in fact comprise a plurality of modules, and that memory 1012 may exist at multiple levels, from high speed registers and caches to lower speed but larger dynamic random access memory (DRAM) chips. The memory 1012 may include an operating system 1013. Any operating system supporting the functions disclosed herein may be used.

Memory 1012 may also include an infill program 1022 which, when executed by CPU 1011, enables the analysis of the data and factors described herein, and also enables the determination of whether, where, and how an independent seismic source may be used in a marine seismic survey. Generally speaking, the memory 1012 may include one or more programs configured to fully-automatically or semi-automatically steer acquisition and other vessels to provide the features described herein, or, the memory 1012 may provide data to a user to enable the user to make such determinations.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the invention unless specifically set forth in the claims.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media or storage media allowing only a single writing event (e.g., read-only memory devices within a computer such as CD-ROM disks readable by a CD-ROM drive or DVDs readable by a DVD drive); (ii) alterable information stored on writable storage media (e.g., floppy disks within a diskette drive or hard-disk drive, USB memory sticks, etc.); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the computer into a machine-readable format and hence executable instructions. Also, programs are comprised of variables and data structures that either reside locally to the program or are found in memory or on storage devices.

What is claimed is:

1. A method of seismic data acquisition, comprising:
    acquiring primary seismic data at a plurality of streamers towed by an acquisition vessel based at least in part on energy emitted by a first seismic source;
    towing an independent seismic source to acquire infill seismic data at the plurality of streamers based at least in part on energy emitted by the independent seismic source while the primary seismic data is still being acquired at the plurality of streamers based at least in part on the energy emitted by the first seismic source, wherein the independent seismic source is towed independently of the acquisition vessel;
    determining areas in which infill seismic data is to be acquired based at least in part on a real-time analysis of the acquired primary seismic data; and
    positioning the independent seismic source based at least in part on the determined areas and on measured feathering of the plurality of streamers.

2. The method of claim 1, wherein the first seismic source is also towed independently of the acquisition vessel.

3. The method of claim 1, wherein the primary seismic data is acquired further based on energy emitted by second and third seismic sources.

4. The method of claim 3, wherein the first, second, and third seismic sources are towed over one or more of the plurality of streamers in an undulating manner between a left side and a right side of a source navigation region.

5. The method of claim 1, wherein the first seismic source is towed by the acquisition vessel.

6. The method of claim 1, wherein the independent seismic source is towed by an independent source vessel following posterior ends of the plurality of streamers and at a lateral displacement from a sail line traversed by the acquisition vessel.

7. The method of claim 6, further comprising:
    towing one or more additional streamers by the independent source vessel.

8. The method of claim 6, wherein the lateral displacement is adjusted in real-time based at least in part on the measured feathering of the plurality of streamers.

9. The method of claim 8, wherein the lateral displacement is an average lateral displacement and the independent source vessel undulates about the average lateral displacement.

10. The method of claim 6, wherein an inline displacement behind the posterior ends of the plurality of streamers at which the independent seismic source is towed is adjusted in real-time based at least in part on the measured feathering of the plurality of streamers or coverage of the acquired primary seismic data.

11. The method of claim 1, wherein the independent seismic source is towed by an independent source vessel ahead of the acquisition vessel and at a lateral displacement from a sail line traversed by the acquisition vessel.

12. The method of claim 1, wherein the acquisition vessel travels along a first sail line to acquire primary seismic data along the first sail line and subsequently travels along a second sail line, adjacent to the first sail line, to acquire primary seismic data along the second sail line.

13. The method of claim 12, further comprising:
    determining, while the acquisition vessel travels along the second sail line, whether to use the independent seismic source to acquire infill seismic data associated with the second sail line or to acquire infill seismic data associated with the first sail line.

14. The method of claim 13, wherein said determining is based at least in part on real-time analysis of coverage of a combination of the primary seismic data and infill seismic data acquired along the first sail line, coverage of the primary seismic data acquired along the second sail line, or coverage of the combination of primary seismic data and infill seismic data acquired along the first sail line and coverage of the primary seismic data acquired along the second sail line.

15. The method of claim 13, further comprising:
    performing real-time modeling or deterministic algorithmic prediction based at least in part on the measured feathering of the plurality of streamers along the second sail line and analysis of coverage of a combination of the primary seismic data and infill seismic data acquired along the first sail line to predict likely improved coverage resulting from acquiring infill seismic data associated with the first sail line and likely improved coverage resulting from acquiring infill seismic data associated with the second sail line, wherein said determining to acquire infill seismic data associated with the second sail line or to acquire infill seismic data associated with the first sail line is based at least in part on said real-time modeling or said deterministic algorithmic prediction.

16. The method of claim 1, wherein the acquired primary seismic data is analyzed following sensing of reflected seismic energy but prior to posterior ends of the plurality of streamers completing acquisition of the primary seismic data along a first sail line.

17. The method of claim 1, wherein one or more parameters associated with a vessel towing the independent seismic source are controlled based at least in part on said analysis of the acquired primary seismic data, said one or more parameters including a speed, a direction, an inline distance from posterior ends of the plurality of streamers or ahead of the acquisition vessel, an average lateral distance from a sail line of the acquisition vessel, and an undulation around the average lateral distance from the acquisition vessel.

18. The method of claim 1, further comprising:
predicting additional areas which are likely to require infill seismic data to be acquired; and
towing the independent seismic source based at least in part on the predicted additional areas.

19. The method of claim 1, further comprising:
replacing the first seismic source with the independent seismic source in the event that the first seismic source is taken out of service.

20. The method of claim 1, further comprising:
following acquisition of the primary seismic data along a first sail line based at least in part on the energy emitted by the first seismic source, continuing to acquire the infill seismic data as posterior ends of the streamers continue to traverse the first sail line.

21. The method of claim 1, wherein the independent seismic source emits seismic energy substantially contemporaneously to the first seismic source emitting seismic energy.

22. The method of claim 1, wherein the independent seismic source is towed so as to generate ultra-long offset infill seismic data using the independent seismic source.

23. The method of claim 1, wherein towing the independent seismic source comprises:
acquiring the infill seismic data based on an assessment of a coverage of the primary seismic data, the coverage of the primary seismic data including an interpolation of sub-surface sampling using a regularization process.

24. A seismic data acquisition system, comprising:
an acquisition vessel configured to tow a plurality of streamers;
a first seismic source configured to cause the plurality of streamers to acquire primary seismic data based at least in part on seismic energy emitted by the first seismic source;
an independent seismic source configured to cause the plurality of streamers to acquire infill seismic data based at least in part on seismic energy emitted by the independent seismic source while the primary seismic data is acquired based at least in part on the seismic energy emitted by the first seismic source;
a data storage system coupled to the plurality of streamers and configured to store primary seismic data and infill seismic data acquired by the plurality of streamers; and
a processor configured to determine areas in which infill seismic data is to be acquired based at least in part on a real-time analysis of the acquired primary seismic data, and to position the independent seismic source based at least in part on the determined areas and on measured feathering of the plurality of streamers.

25. A non-transitory computer-readable medium storing code for seismic data acquisition, the code comprising instructions executable to:
acquire primary seismic data at a plurality of streamers towed by an acquisition vessel based at least in part on energy emitted by a first seismic source;
tow an independent seismic source to acquire infill seismic data at the plurality of streamers based at least in part on energy emitted by the independent seismic source while the primary seismic data is still being acquired at the plurality of streamers based at least in part on the energy emitted by the first seismic source, wherein the independent seismic source is towed independently of the acquisition vessel;
determine areas in which infill seismic data is to be acquired based at least in part on a real-time analysis of the acquired primary seismic data; and
position the independent seismic source based at least in part on the determined areas and on measured feathering of the plurality of streamers.

* * * * *